US012270366B1

(12) United States Patent
Brandenburg

(10) Patent No.: US 12,270,366 B1
(45) Date of Patent: Apr. 8, 2025

(54) POWER DRILL-ACTIVATED START MECHANISM FOR GAS-POWERED ENGINES

(71) Applicant: David G Brandenburg, Overton, TX (US)

(72) Inventor: David G Brandenburg, Overton, TX (US)

( * ) Notice: Subject to any disclaimer, the term of this patent is extended or adjusted under 35 U.S.C. 154(b) by 0 days.

(21) Appl. No.: 18/592,978

(22) Filed: Mar. 1, 2024

Related U.S. Application Data

(60) Provisional application No. 63/620,153, filed on Jan. 11, 2024.

(51) Int. Cl.
*F02N 11/12* (2006.01)
*F02N 15/00* (2006.01)

(52) U.S. Cl.
CPC .............. *F02N 11/12* (2013.01); *F02N 15/00* (2013.01)

(58) Field of Classification Search
CPC ................................. F02N 11/12; F02N 15/00
USPC .............................. 123/179.24, 179.26; 74/6
See application file for complete search history.

(56) References Cited

U.S. PATENT DOCUMENTS

| | | | | | |
|---|---|---|---|---|---|
| 2,385,963 | A * | 10/1945 | Beard | F02N 5/02 185/39 |
| 2,816,535 | A * | 12/1957 | Sells | F02N 11/12 192/41 R |
| 3,645,247 | A * | 2/1972 | D'Ambrosio | F02N 11/12 123/179.26 |
| 4,365,596 | A * | 12/1982 | Bennett, Sr. | F02N 11/12 74/6 |
| 2007/0240664 | A1* | 10/2007 | Thomas | F02N 1/00 123/179.27 |
| 2017/0363056 | A1* | 12/2017 | Budden | F02N 11/12 |
| 2018/0195484 | A1* | 7/2018 | Koehler | F02N 11/12 |
| 2019/0170106 | A1* | 6/2019 | Koehler | F02N 15/006 |

FOREIGN PATENT DOCUMENTS

| | | | | |
|---|---|---|---|---|
| FR | 3066865 | A3 * | 11/2018 | F02N 1/02 |

* cited by examiner

*Primary Examiner* — Mahmoud Gimie
(74) *Attorney, Agent, or Firm* — Richard Eldredge; Leavitt Eldredge Law Firm

(57) ABSTRACT

A power drill-activated start system for gas-powered engines eliminates the need for the use of manual pull-start mechanisms by leveraging the mechanical advantage provided by a rotational drive tool, such as a power drill. The start system has a stem connecting a drive interface with a plurality of engagement members. The drive interface is configured to receive rotational motion as input from the rotational drive tool. The stem transmits the rotational motion to the plurality of engagement members, which interface with a rotating component of a gas-powered engine, such as a flywheel, thereby facilitating engine startup.

6 Claims, 3 Drawing Sheets

POWER DRILL-ACTIVATED START MECHANISM FOR GAS-POWERED ENGINES

CROSS-REFERENCE TO RELATED APPLICATIONS

This application claims the benefit of U.S. Provisional Application No. 63/620,153, filed on Jan. 11, 2024, which is hereby incorporated by reference in its entirety.

BACKGROUND

1. Field of the Invention

The present invention relates generally to power tool systems, and more specifically to a mechanism for initiating the operation of gas-powered engines without the need for manual pull-start methods.

2. Description of Related Art

Pull-start systems are well known in the art and are commonly employed in the operation of gas-powered tools and lawn equipment. These systems typically involve a cord that, when pulled, engages a crankshaft to initiate the engine's operation. Such mechanisms have components configured to translate a manual pulling force into rotational energy required to start the engine.

One of the problems commonly associated with conventional pull-start systems is the physical exertion required to operate them. This can lead to user fatigue, increased risk of injury, and can be particularly challenging when the mechanisms become worn and less efficient, often necessitating multiple pulls to start the engine. Furthermore, these systems are not ergonomic and present safety concerns arising from the repetitive and sometimes forceful nature of the pulling action required.

Accordingly, although great strides have been made in the area of engine start systems for gas-powered tools, many shortcomings remain. It is therefore an object of the present invention to provide a start mechanism that mitigates the need for manual pulling, reduces user strain, and improves the safety and ergonomic operation of gas-powered equipment.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
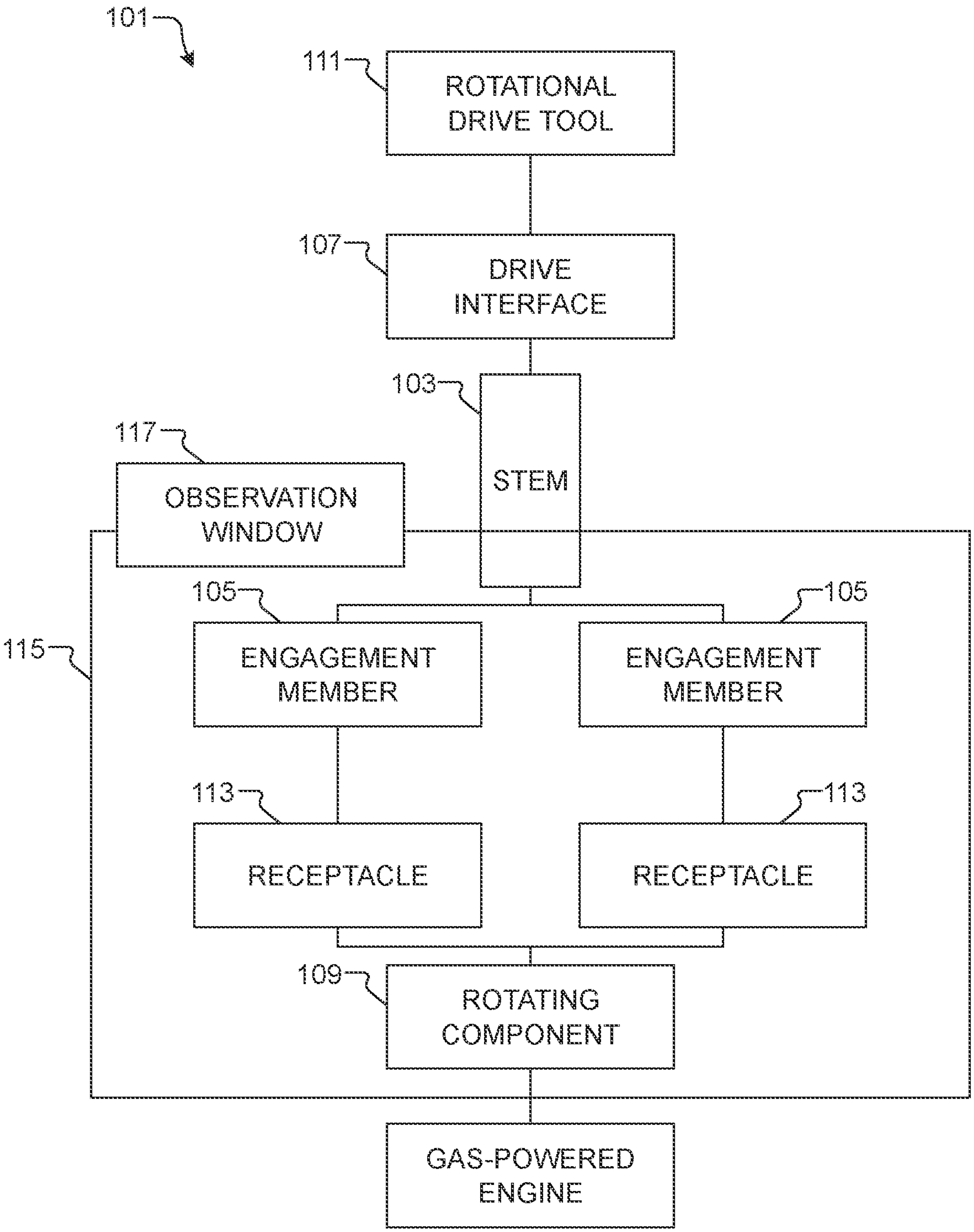
FIG. 1 is a schematic diagram of a preferred embodiment of the start system of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional start systems for gas-powered engines. Specifically, the system of the present invention enables the use of a rotational drive tool, such as a power drill, to eliminate the need for manual operation of a pull start system. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
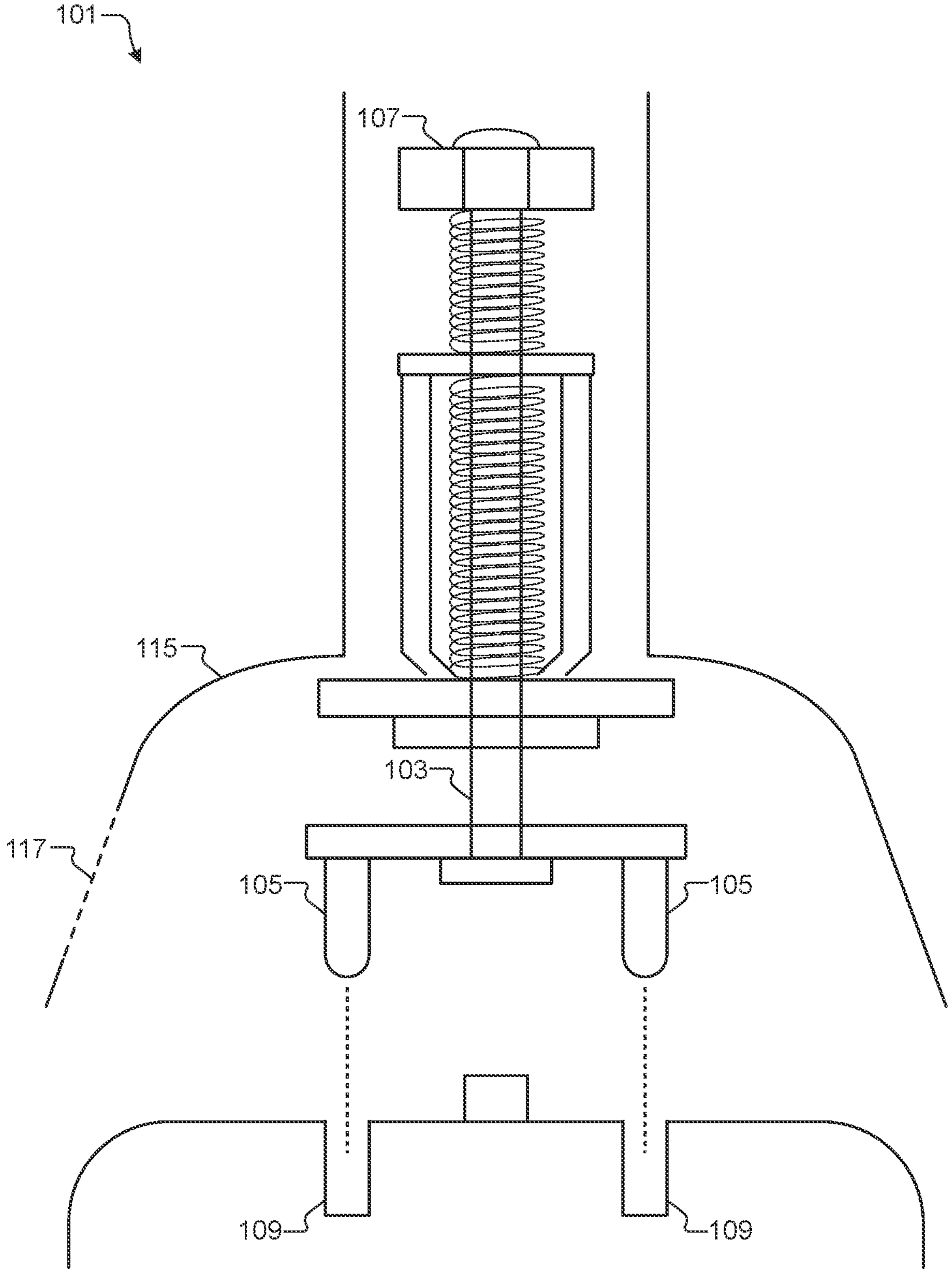
FIG. 2 is a side illustrative view of a preferred embodiment of the start system.

Referring now to the drawings wherein like reference characters identify corresponding or similar elements throughout the several views, FIGS. 1-2 depict a schematic diagram and illustrative side view of a start system for gas-powered engines 101 in accordance with a preferred embodiment of the present application. It will be appreciated that the start system 101 overcomes one or more of the above-listed problems commonly associated with conventional start systems for gas-powered engines. In addition, it should be appreciated that more or fewer of such components may be included in different embodiments of the start system 101.

In the contemplated embodiment, the start system for initiating operation of a gas-powered engine 101 includes a stem 103, a plurality of engagement members 105 affixed to the stem 103, and a drive interface 107 positioned on the stem 103 opposite the engagement members 105. The start system 101 is configured to initiate the operation of gas-powered engines by leveraging the mechanical advantage provided by a rotational drive tool 111, such as a power drill, thereby eliminating the manual effort traditionally associated with pull-start mechanisms.

The stem 103 is configured for attachment to a rotating component 109 within the gas-powered engine, facilitating the transfer of rotational motion to the engine's internal mechanisms. The rotating component 109 may be generally understood to be a flywheel, which typically receives rotational motion from a pull start mechanism in conventional start systems. More particularly, the plurality of engagement members 105 enable said transfer of rotational motion from the stem 103 to the rotating component 109, wherein the drive interface 107, stem 103, and engagement members 105 are configured to rotate concentrically with the rotating component 109.

The drive interface 107 is configured to operatively connect to a rotational drive tool 111. In the contemplated embodiment, the drive interface 107 is a hexagonal protrusion or similar member configured to interface with a socket, which is in turn driven by a power drill as the rotational drive tool 111. However, the drive interface 107 and rotational drive tool 111 may vary in different embodiments. In general, the drive interface 107 is configured to receive rotational motion as input from the rotational drive tool 111 and transfer the rotational motion through the stem 103 and the plurality of engagement members 105 to the rotating component 109, thereby initiating operation of the gas-powered engine. It should be further understood that the stem 103 and engagement members 105 of the present invention may be configured in various embodiments to be retrofitted into existing gas-powered engines to replace existing pull-start mechanisms.

It is contemplated that in various embodiments, the specific nature of the plurality of engagement members 105 and their connection to the rotating component 109 may vary without departing from the intended spirit and scope of the present invention. In the contemplated embodiment, the engagement members 105 are pins connected to the stem 103, radially and equidistantly offset from the stem's 103 axis of rotation. In the contemplated embodiment, the stem 103 terminates in a plate or disc-like structure to which the engagement members 105 are connected, providing said radial offset. This stem 103 and plate structure may be understood to resemble an inverted capital T shape, similar to valves typical to internal combustion engines.

In the contemplated embodiment, the flywheel comprises a corresponding plurality of receptacles 113 configured to receive the engagement members 105. To retrofit the present invention into existing engines, these receptacles 113 must be added to the existing flywheel through subtractive manufacturing such as drilling or other machining operations.

A modified housing 115 is also contemplated within the start system 101, accommodating the new start mechanism and preferably including an observation window 117 or port. The observation window 117 provides a means for visual inspection to confirm the proper engagement and operation of the start system 101.

Additional features may be included in various embodiments. For example, a safety collar may be included around the stem 103 to prevent unintentional disengagement during operation. This safety collar ensures that the connection between the stem 103 and the rotating component 109 remains secure, even in the event of a jam or other operational issue that might otherwise cause a safety concern.

Figure 3:
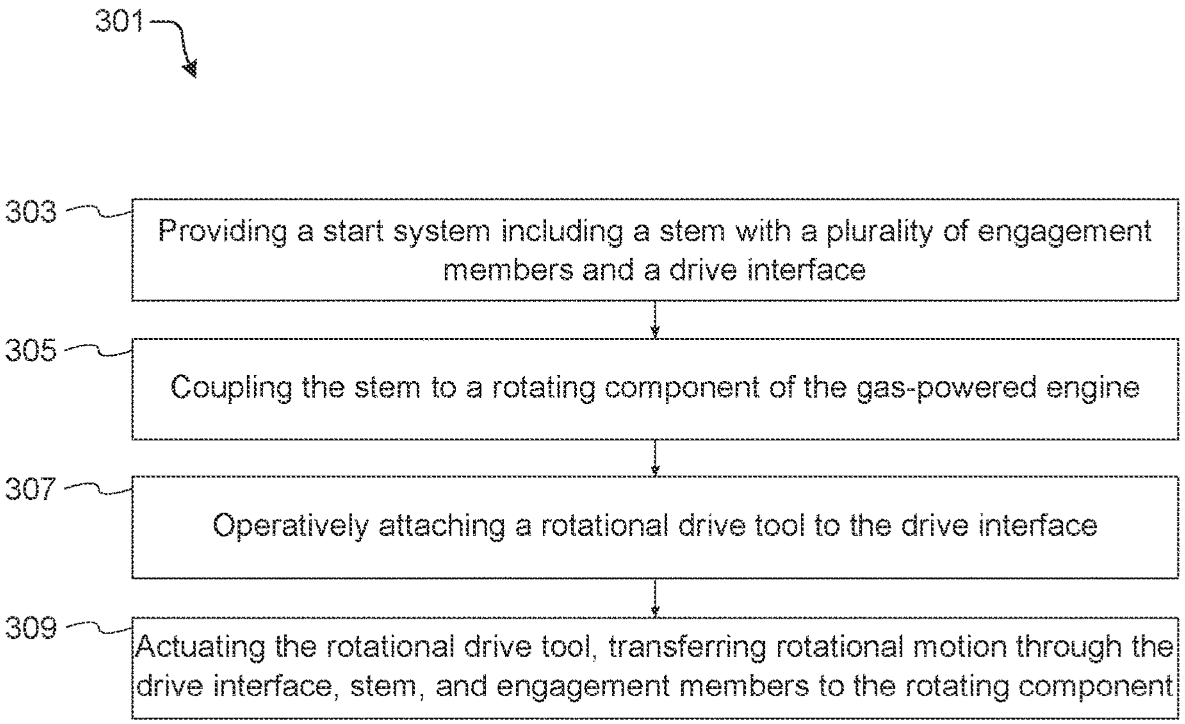
FIG. 3 is the methodology of use of the start system of FIGS. 1 and 2.

FIG. 3 depicts a method of use 301 for the system of FIGS. XX, YY, and Z in accordance with an embodiment of the present invention. The method 301 initiates with step 303 of providing a start system including a stem with a plurality of engagement members and a drive interface connected opposite each other thereto. This step may involve assembling or retrofitting the start system onto a gas-powered engine.

The method 301 further includes a step 305 of coupling the stem to a rotating component of the gas-powered engine. Subsequently, a rotational drive tool is operatively attached to the drive interface in step 307. Finally, in step 309, the rotational drive tool is actuated, transferring rotational motion through the drive interface, stem, and engagement members to the rotating components, thereby initiating operation of the gas-powered engine through the transferred rotational motion.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A start system for a gas-powered tool having a flywheel configured to rotate and to start the gas-powered tool, the start system comprising:

a rotational drive tool;

a stem extending from a first end to a second end;

a drive interface secured to the first end and configured to releasably engage with the rotational drive tool;

a disc-shaped body secured to the second end;

a plurality of engagement members protruding from the disc-shaped body, the plurality of engagement members are configured to releasably engage with and rotate the flywheel;

a housing configured to house the stem, the drive interface, the disc-shaped body, and the plurality of engagement members; and an observation window secured to the housing.

2. The invention of claim 1, wherein the engagement members and the drive interface are positioned opposite each other along the stem and concentric with the rotating component.

3. The invention of claim 1, wherein the stem and plurality of engagement members are configured to be retrofitted into an existing gas-powered tool equipped with pull-start mechanisms.

4. The invention of claim 1, wherein the drive interface is configured to be driven using a socket.

5. The invention of claim 1, wherein the flywheel comprises a plurality of receptacles configured to receive the plurality of engagement members.

6. A method for starting the gas-powered tool, the method comprising the steps of:

providing the invention of claim 1;

coupling the stem to the rotating component of the gas-powered tool;

attaching the rotational drive tool to the drive interface; and actuating the rotational drive tool, transferring rotational motion through the drive interface, stem, and engagement members to the rotating component, thereby initiating operation of the gas-powered tool through the transferred rotational motion.

* * * * *